United States Patent [19]

Mueller

[11] Patent Number: 5,354,239
[45] Date of Patent: Oct. 11, 1994

[54] BOWLING PIN WITH INTERLOCKING SHELL TO FOAM CORE AND BASE

[75] Inventor: Alvin W. Mueller, St. Louis, Mo.

[73] Assignee: Mueller-Perry Co., Inc., St. Louis, Mo.

[21] Appl. No.: 79,040

[22] Filed: Jun. 21, 1993

Related U.S. Application Data

[63] Continuation-in-part of Ser. No. 735,001, Jul. 22, 1991, Pat. No. 5,240,248, which is a continuation-in-part of Ser. No. 438,048, Nov. 20, 1989, abandoned, which is a continuation-in-part of Ser. No. 294,654, Jan. 9, 1989, abandoned.

[51] Int. Cl.$^5$ ................................. A63B 63/00
[52] U.S. Cl. ............................... 473/119; 473/124; 264/48; 264/274
[58] Field of Search ............... 473/118, 119; 264/41, 264/45.1, 48, 274, 278

[56] References Cited

U.S. PATENT DOCUMENTS

| | | | |
|---|---|---|---|
| 2,180,676 | 11/1939 | Guimond | 273/82 |
| 2,517,116 | 8/1950 | Klinger | 273/82 |
| 2,738,977 | 3/1956 | Riley | 273/82 |
| 3,169,020 | 2/1965 | Smith | 273/82 |
| 3,186,713 | 6/1965 | Hebble | 273/82 |
| 3,229,978 | 1/1966 | Guglielmo, Sr. | 273/82 |
| 3,232,616 | 2/1966 | Conklin et al. | 273/82 |
| 3,237,945 | 3/1966 | Isenberg et al. | 273/82 |
| 3,240,646 | 3/1966 | Smith | 156/213 |
| 3,301,560 | 1/1967 | Satchell et al. | 273/82 |
| 3,445,113 | 5/1969 | Satchell et al. | 273/82 |
| 3,477,721 | 11/1969 | Satchell et al. | 273/82 |
| 3,525,524 | 8/1970 | Schmid | 273/82 |
| 3,971,837 | 7/1976 | Hasegawa et al. | 264/46.6 |
| 4,322,078 | 3/1982 | Mallette | 273/82 B |
| 4,445,688 | 5/1984 | Frillici et al. | 273/82 R |
| 4,457,511 | 7/1984 | Witkowski | 273/82 R |
| 4,865,320 | 9/1989 | Unterberger | 273/182 B |
| 4,971,322 | 11/1990 | Jager | 273/82 R |

FOREIGN PATENT DOCUMENTS

| | | | |
|---|---|---|---|
| 974717 | 9/1975 | Canada | 18/113.21 |
| 1058307 | 2/1967 | United Kingdom . | |

OTHER PUBLICATIONS

Design Considerations and Guide Specifications, Urethane Foam Contractors p. 9.
Adhesion and Bonding, Ed. Norbert M. Bikales, Wiley-Interscience Publishers, pp. 137–142.

Primary Examiner—Vincent Millin
Assistant Examiner—William M. Pierce
Attorney, Agent, or Firm—Jerome A. Gross

[57] ABSTRACT

A method for forming a plastic composite bowling pin includes removing the surface skin of a foam core, mounting a plastic base ring on such core, and molding a relatively thick elastomer shell around the prepared core and the base ring so that the hardening of the shell interlocks the shell, core and base ring. A pin made by this method is easily refurbished by removing the base ring and part of the shell and re-molding the surface of the shell.

11 Claims, 3 Drawing Sheets

BOWLING PIN WITH INTERLOCKING SHELL TO FOAM CORE AND BASE

CROSS-REFERENCE TO RELATED APPLICATIONS

This is a continuation-in-part of patent application Ser. No. 07/735,001, filed Jul. 22, 1991, abandoned; which was itself a continuation-in-part of patent application Ser. No. 07/438,048, filed Nov. 20, 1989, abandoned; itself a continuation-in-part of patent application Ser. No. 07/294,654, filed Jan. 9, 1989, abandoned.

BACKGROUND OF THE INVENTION

1. Field of the Invention:

This invention relates to bowling pins formed of plastic.

2. Description of Related Art:

Short supply of suitable woods make important the development of plastic bowling pins, whose performance in competition must be equivalent to approved wood pins.

Experimental bowling pins have been made with plastic shells over wood or foam cores. Such pins have experienced serious problems of separation of the shell from the core. There have been some attempts, as in U.S. Pat. No. 3,971,837 to Hasegawa, to solve this problem by forming grooves in the exterior surface of the core, and casting the plastic shell thereabout to fill and hold to the grooves.

Plastic base rings have been customarily used on wood pins to avoid excessive sliding on the lane. Hasegawa used three pre-formed plastic base rings on a composite pin, but Hasegawa does not teach any method to prevent the separation of the ring from the composite pin.

Wood pins have an added disadvantage in that once a pin is damaged it cannot be refurbished for use. A composite pin which can be refurbished is highly desirable.

SUMMARY OF THE INVENTION

Bowling pins are made by a method embodying the present invention by first molding a foam polyurethane core. At the base of the core there is a shallow reduced diameter cylindrical portion. The smooth exterior "skin" inherent to foam molding is removed from the core surface. The result is to transect and open the foam cells which were adjacent to the core surface skin.

I have found that in the interim before the shell is molded, if there is substantial delay between forming the core and the shell, atmospheric moisture is likely to collect in the transected foam cells. It appears that such moisture interacts when the shell material is cast, to form pressurized gas which may prevent bonding of the shell to the core. Therefore, after the surface skin has been removed, the cores should be kept moisture-free either by storing them in a dry location, packing them in plastic bags which may contain desiccant material, or oven-drying them prior to the application of the shell. The bond then formed, when the prepared core is inter-penetrated by the cast shell material, is both uniform and strong.

To create a shell of substantially uniform thickness, I first mount a nylon base ring, hereafter described, on the lower portion of the prepared core. I support these on a small-diameter pedestal at the bottom of the shell mold; the axis of the core is penetrated by a screw which secures and centers the core. The liquid plastic to form the shell is poured through a top center mold aperture, around a small diameter alignment peg inserted axially in the upper end of the core; it passes through the passages provided in the base ring to interlock it and flow beneath the bottom of the core. To provide for substantially axial concentricity of the core and the shell as well as to substantially finish the top end of the pin, as soon as the precise amount of shell material has been poured, a shoulder bushing having a concave bottom is fitted downward over the alignment peg to insure centering of the core; its concave bottom forms the convex contour of the top of the bowling pin.

The shell material may be pigmented throughout, so that surface mars can be merely polished away. Such shell material is also exceptionally hard, so that it resists chipping. The composite pin formed by this process is virtually unbreakable; the core will not separate from the shell.

The polyurethane elastomer shell material lends itself to refurbishing. After a great deal of usage, the pin may be placed in a lathe, and approximately 25% of the thickness of the shell removed. The base ring and the portion of the shell within the ring are then removed. A new base ring is attached and a new shell exterior molded thereon. The original shell mold may be used for this purpose.

DESCRIPTION OF THE PREFERRED EMBODIMENT

Figure 5:
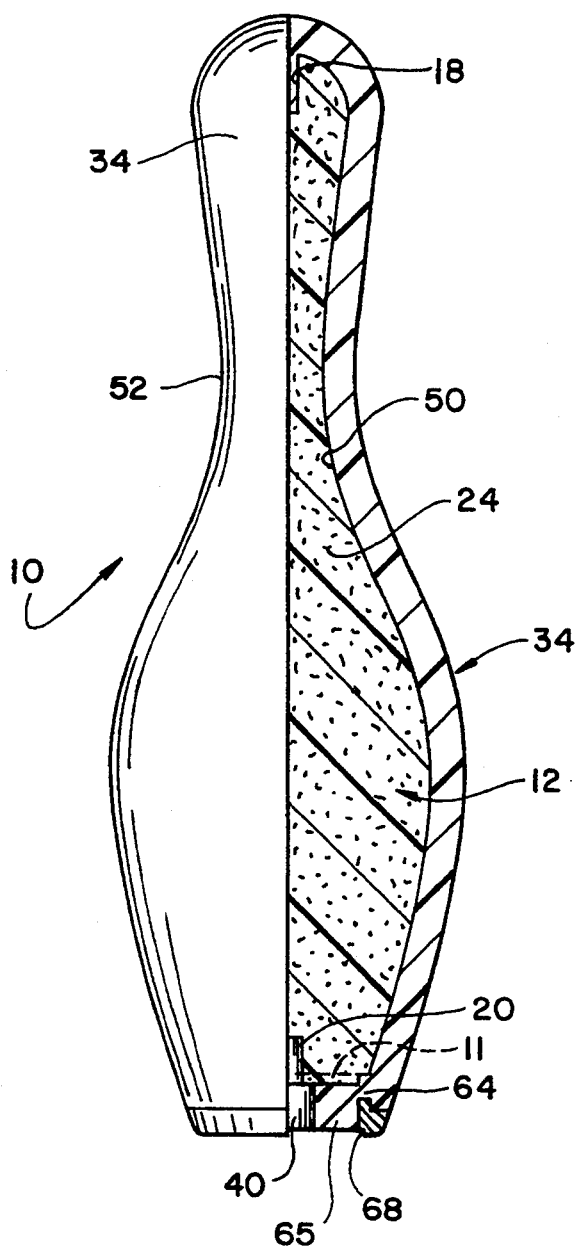
FIG. 5 is a side view, partly in elevation and partly in section, of the finished bowling pin made by a process using the present invention. The partial section of the base ring is cut through a flow channel of the base ring.

A bowling pin, generally designated 10, constructed by a method embodying the present invention is shown in FIG. 5. The bowling pin 10 has a foam core, generally designated 12, shown in FIG. 1, preferably of foamed polyurethane with a free-rise density of from five to sixteen pounds per cubic foot. Preferably the core 12 is formed within a conventional mold into which the liquid foam has been poured to provide, when cured, a foam core of desired density, say from ten to forty pounds per cubic foot and weighing about ¾ pounds. The core 12 is allowed to cure at 100° F. to 110° F. Conventional axial alignment pegs provide the molded core 12 with shallow narrow upper and lower axial alignment bores 18, 20.

As the core 12 cures, it forms a relatively smooth integral skin 22 against the inner wall of the core mold. Such core skin contains few foam cells and can extend into such core for a distance of from 1/32 inch to ⅛ inch. If the core mold has not been formed with a conventional Teflon coating, a mold release agent will have been applied to its interior. After removing the core 12 from the core mold such mold release agent is first removed from the surface of the core 12, conveniently by a conventional chemical cleaner.

I have found that plastic shell material will not bond securely to such a cleaned core 12. To obtain a secure bond, I remove its surface skin 22, shown in FIG. 1, from the entire core 10. While the preferred removal process in production may be by machine controlled shot peening, thorough sanding or turning by lathe will suffice if followed by careful visual inspection and the other quality-control procedures, including drying the core, hereafter described.

Figure 1:
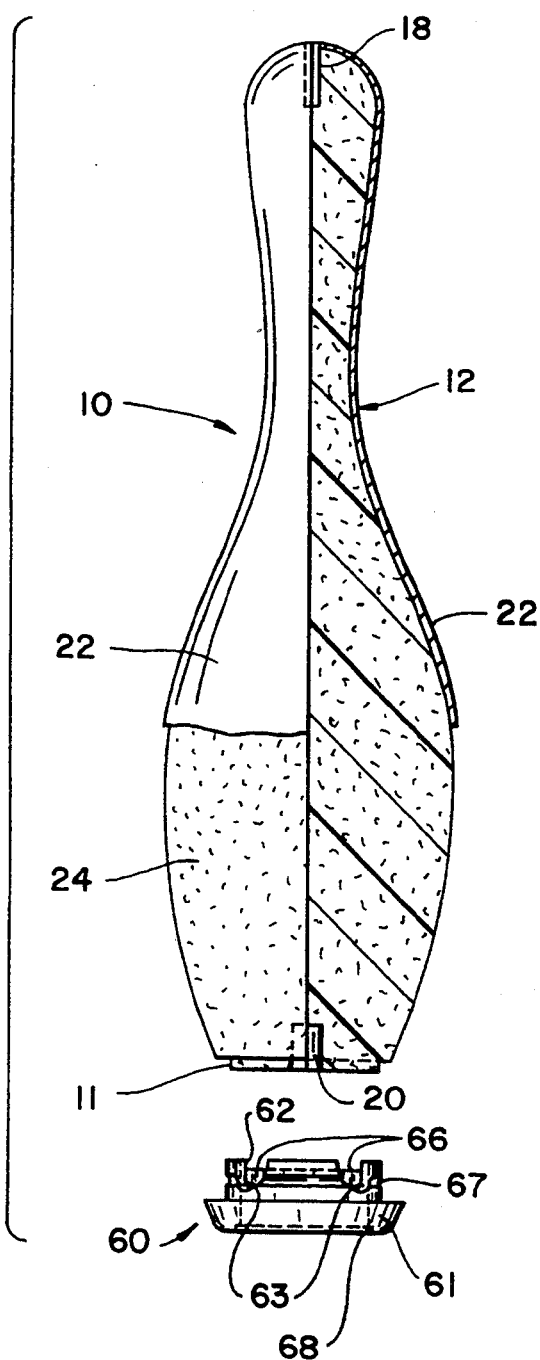
FIG. 1 is a side view, partly in elevation and partly in section of the molded core of a bowling pin made using the process of the present invention, with a nylon base ring exploded downwardly. Above a break-away line on the core side is shown the core skin prior to its removal. The portion below the break-away line shows the open transected cells of the core surface after such skin has been removed according to the process of this invention.
Figure 2:
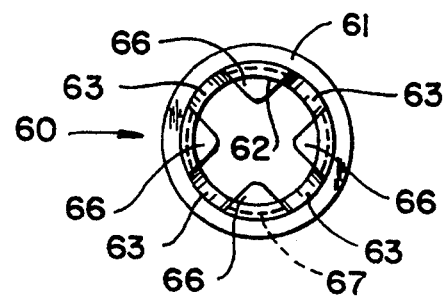
FIG. 2 is a top view of the base ring of FIG. 1.
Figure 3:
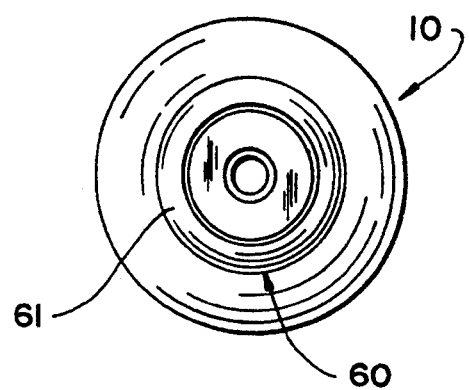
FIG. 3 is a bottom view of the foam core and base ring of FIG. 1.

The plastic base ring, shown in FIGS. 1 and 2 and generally designated 60, is preferably of nylon. The ring 60 is generally of annular shape and consists of a downwardly rounded outer base portion 61 which has a bottom annular groove 68 cut into its bottom, and a vertical central cylindrical annular portion 62 the central channel of which is partially obstructed by a plurality, preferably four, of inwardly-directed lugs 66 and the outer surface of which is also circumscribed by a peripheral groove 67. In the present invention, the annular portion 62 is horizontally penetrated by a chosen plurality of flow channels 63, here shown to be four such channels. When assembled, the ring annular portion 62 fits around the base portion 11.

Figure 4:
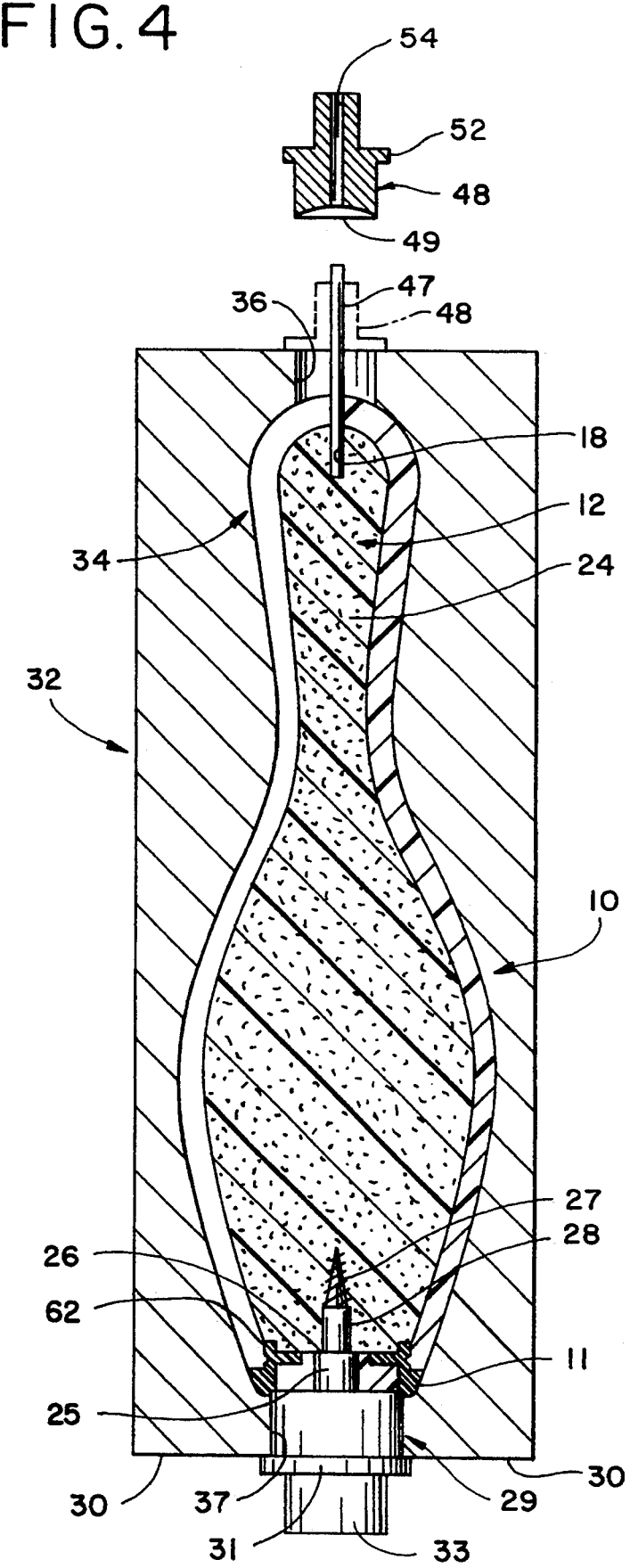
FIG. 4 is a cross-sectional schematic view of a conventional shell mold containing the foam core and base ring of FIG. 1, its right half shows the shell formed on the core. The section of the base ring is cut through the locking lugs of the base ring.

The core 12, now having a transected foam cell surface 24, shown at lower left of FIG. 1, with the base ring 60 in place around the core base portion 11, is then mounted between the halves of a conventional shell mold 32 in FIG. 4. The size of the cavity of the shell mold 32 is such that the outer surface of the finished bowling pin 10 will conform to desired dimensions after any shrinkage encountered during curing. The core bottom 11 rests on the base ring lugs 66 and is supported on the horizontal shoulder 26 of a central bottom pedestal 25 integral with a cylindrical base plug generally designated 29, which fits sealedly within semi-cylindrical notches 37 in the shell mold bottom portions 30, and fits into the bottom annular groove 68 of the base ring 60. Above the shoulder 26 is a sleeve portion 28 fitted into the core's lower alignment bore 20, and a screw end 27. The plug 29 has an exterior flange 31 presented against the undersurfaces of the mold bottom portions 30; below flange 31 is a head 33 with parallel wrenching flats. When the base plug 29 is inserted into the bottom 30 of mold 32, and wrenched, the screw end 27 draws the core down onto the shoulder 26, centering the core 12 in the mold 32.

The plastic shell generally designated 34, formed in the shell mold 32, consists preferably of a polyurethane elastomer which when cured has a Shore-D hardness rating of from 65 to 80. The liquid elastomer is preferably pigmented throughout with titanium oxide and which additionally includes white pigment, preferably Morton Thiokol 7-102 white pigment. Before pouring the liquid plastic shell material, an alignment peg 47 is inserted into the small axial bore 18 at the top of the core 12. The shell mold 32, then closed, is filled through the pouring aperture 36 in its top with liquid polyurethane elastomer, which flows through the flow channels 63 to fill the space between the base ring 60 and pedestal 25 to form the inner base portion 65 about an axial hollow 40. The shell mold 32 may be tilted to one side and the liquid elastomer introduced through a tube inserted through aperture 36 and extending down the underside of the core. As the base portion 65 fills, such tilting of the mold 32 assures that air within the base ring 60 can escape through a flow channel 63.

Immediately after the shell mold 32 is filled, a shouldered bushing 48, shown raised in FIG. 4, is inserted within the mold pouring aperture 36 so that its projecting shoulder 52 rests on top of the shell mold 32, as shown in phantom lines. Its axial bore 54 fits closely around the alignment pin 47 and its concave bottom surface 49 conforms to the rounded upper end of the pin 10. This serves to assure centering the top of the core, and to insure that the formed shell 34 is of uniform thickness, preferably about 7/16 inch. The thickness of the shell insures, among other things, that the shear strength in the neck region of the pin 10 is sufficient to withstand long use without breaking.

Figure 6:
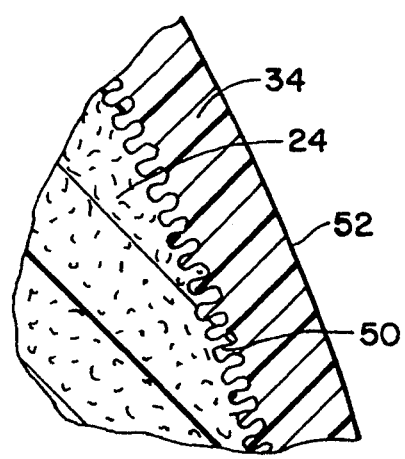
FIG. 6 is a greatly enlarged view of a fragment of the interlocking core-shell interface of the bowling pin of FIG. 5, shown somewhat exaggerated for clarity.

As the shell 34 is cast, the liquid plastic shell material fills interlockingly into the transected foam cell surface 24, and as the shell 34 cures, at preferably 155°±10° F., this interlocking provides an extremely strong physical bond 50 with the core 12 as shown enlarged in FIG. 6. This interlocked bond 50 cannot split apart, loosen or allow the shell 34 to separate from the core 12.

When cured, the shell material in each of the flow channels 63 of the nylon base ring 60 forms integral solid plastic tie portions 64 which connect the shell portion 34 with the inner base portion 65. These tie portions 64, and the portion of the inner base 65 in contact with the lugs 66, prevent the base ring 60 from separating from the remainder of the bowling pin.

After the bowling pin 10 is removed from the shell mold 32, the axial pin 47, if made of wood or plastic, may merely be trimmed off; or if removed, the indentation is filled with liquefied polyurethane elastomer of the same type which comprises the shell 34, and the pin 10 is then finished by polishing.

Alternatively, the shell material may be injected into the shell mold 32 from the bottom or side of the pin (not shown). Any sprue resulting from the casting process may be removed from the pin and the surface finished by polishing as before.

In developing the present pins, each was tested to ascertain whether any voids exist between the core 12 and shell 34. Each completed pin 10 was laid to float horizontally in water. When it ceased rotating, if there was any substantial void it would be found immediately beneath the shell side which then floats upward.

Such voids would appear as broad, shallow spaces between the core 12 and the shell 34. When a pin 10 which contained a void was sawed open across the void, the shell inner surface at the void would not be interlocked as in FIG. 6, but free and clear of core material. In contrast, when a void-free pin, bonding according to the present invention, is sawed open and an attempt is made to break the core 12 loose, breakage occurs within and across the core material; even when the breakage line extends close to the shell 34, core material remains attached to the shell.

The present steps of removing the skin 22 and maintaining the cores dry succeeded in achieving inseparable bonding of the shell. Preferably one and one half grams (or a minimum of one and maximum of two and one half grams) are removed from a core weighing approximately 336 grams after chemical cleaning of the release agent. However, the weight and volume of the core 12 control the final weight of the pin 10 and establish the sound of the pin in play. Therefore, it may be useful to vary the core weight and volume to achieve a desired final pin weight and sound in play.

Further experimental work revealed that each skin-removed core must be substantially moisture-free when its shell 34 is cast about it. Cores from which the skin has been removed present open-cell pitted surface areas as shown in FIG. 6, in which atmospheric moisture may accumulate. When moisture is present within these transected cells at the time the shell material is poured, it appears that gases are generated which prevent the liquid plastic shell material from entering these cells and result in voids at the interface. Unless the shell 34 is to be cast onto the core 12 immediately after its skin 22 removal, the core may be freed of moisture by baking, for example, at 125° F. for 30 minutes. Other conventional procedures to maintain or restore dryness may be used, such as packing in plastic bags with desiccant material as mentioned previously.

If it is necessary to permanently mark the pin 10, for example to conform with criteria for official sanction, the desired marking or design may be added by conventional means such as silk screening, heat transfer or pad printing followed by a final coating with a suitable clear finish applied by dipping or spraying. The clear finish is conventional and is selected to give the best surface to resist marking and to be easy to clean.

The finished bowling pin 10 has an extremely strong surface 52 which is highly resistant to mars and abrasions normally occurring with ordinary use. Because the shell material is pigmented throughout, minor abrasions which may occur in use can be merely polished away.

To be acceptable as replacements for wood bowling pins, composite pins must result in comparable scoring. I have found that the weight of the composite pin 10 has an important effect on whether composite pins result in comparable scores to wood pins and that scores are most comparable when composite pins are made to weigh between 3 pounds 3 ounces and 3 pounds 5 ounces, preferably 3 pounds 4 ounces.

Since the preferable foam core 12 weighs about ¾ pounds (about 23% of total pin weight) the remainder of the weight must be added by the shell 34. Thus, the shell 34 preferably weighs about 2 pounds 8 ounces and represents about 77% of total pin weight. This combination of a relatively light core 12 and thick shell 34 provides a very resilient pin 10 with scoring properties similar to wood pins.

If after a great deal of use the bowling pin surface 52 becomes damaged, it can be removed and the pin refurbished. Using the base axial hollow 40 and a centering indentation made in the top of the pin, the pin is readily mounted on a lathe and the shell 34 trimmed with rough lathe cuts. In the process, the old base ring 60 is removed, along with the inner shell base 65 within the base ring 60. Before remolding the shell, another base ring 60 is fitted onto core base 11.

The pin is then refurbished by placing it in a shell mold, such as the original shell mold 32, and remolded in the same manner and with the same type of shell material used when the bowling pin 10 was first formed. To permit free inflow of the new shell material about the narrow neck portion of the pin for thorough distribution of the new material throughout the mold, a substantial part of the total thickness of the shell plastic—roughly between 25% and 50%—of the thickness in the neck portion must be removed. Therefore, in the lathe I remove that portion of the shell 34 in contact with the old base ring 60 and at least about ⅛ inch and preferably 3/16 inch of the shell thickness over the entire portion of the pin above the base ring. This effectuates the free inflow and distribution of the liquid shell material and permits secure bonding of the new material to the original shell portion which remains. The newly added polyurethane will not separate from the previously molded material, but cures with a strong physical and chemical bond.

In the foregoing description, the bowling pin core 12 is referred to as consisting of foamed polyurethane and the bowling pin shell 34 is referred to as consisting of a polyurethane elastomer. Other suitable materials may be or become available.

Since various modifications may be made in the constructions and processes herein described and illustrated without departing from the scope of the invention, it is intended that all matter contained in the foregoing description or shown in the accompanying drawings shall be interpreted as illustrative rather than limiting.

I claim:

1. In the manufacture of a bowling pin having a core of rigid plastic foam, such core having interior cells and a surface skin, such pin also having a shell cast from a liquid plastic which hardens without foaming during curing, the method of forming such shell onto such core comprising the steps of:
    (a) substantially removing such core surface skin, whereby to transect cells therebeneath,
    (b) so molding such shell around such core to provide substantial axial concentricity of such core and such shell, and
    (c) causing such shell to cure,
    whereby such liquid non-foamed plastic of such shell fills said transected cells prior to such curing and forms highly interlocking projections into such core upon such curing, thereby to withstand the shocks of use and the force applied during resurfacing.

2. The method defined in claim 1, together with the further step between steps (a) and (b) thereof comprising
    maintaining such core dry.

3. The method defined in claim 2, wherein said maintaining dry comprises
    heating such core at about 125° F. for about 30 minutes.

4. The method defined in claim 1, wherein the amount of such surface skin removed from such core is about 0.45% to 0.75% of the initial weight of such core.

5. The method defined in claim 1, wherein said removal of such core surface skin of step (a) thereof comprises sanding.

6. The method defined in claim 1, wherein said removal of such core surface skin of step (a) thereof comprises abrading by shot peening.

7. The method defined in claim 1, wherein such shell is molded to be about 7/16 inch thick and to weigh about 2 pounds 8 ounces.

8. The method defined in claim 7, wherein such bowling pin is made to weigh about 3 pounds 4 ounces.

9. In the manufacture of a bowling pin having a core of rigid plastic foam, such core having interior cells, a surface skin, and a reduced diameter core base, such pin also having a base ring extending spacedly beneath such core base and with flow channels cut therethrough, and a shell cast from a liquid plastic which hardens without foaming during curing, the method of forming such shell onto such base ring and such core comprising the steps of:

(a) removing such complete outer surface skin whereby to transect cells therebeneath,
(b) mounting such base ring onto such reduced diameter core base,
(c) so molding such shell around such core with such base ring attached and through such flow channels to provide substantial axial concentricity of such core and such shell, and
(d) causing such shell to cure, whereby prior to said curing such liquid plastic of such shell fills said transected cells, such flow channels and such space beneath such core base thereby to provide an integral base within such base ring and beneath such core base.

10. The method defined in claim 9, wherein such shell is molded to be about 7/16 inch thick and to weigh about 2 pounds 7 ounces.

11. The method defined in claim 10, wherein such bowling pin is made to weigh about 3 pounds 4 ounces.

* * * * *

UNITED STATES PATENT AND TRADEMARK OFFICE
CERTIFICATE OF CORRECTION

PATENT NO. : 5,354,239

DATED : October 11, 1994

INVENTOR(S) : Mueller, Alvin W.

It is certified that error appears in the above-identified patent and that said Letters Patent is hereby corrected as shown below:

Column 6, starting at line 44, delete ", thereby to withstand the shocks of use and the force applied during resurfacing"

Signed and Sealed this

Third Day of January, 1995

Attest:

BRUCE LEHMAN

Attesting Officer     Commissioner of Patents and Trademarks